M. Faloon,
Truss.
No. 78,945.     Patented June 16, 1868.
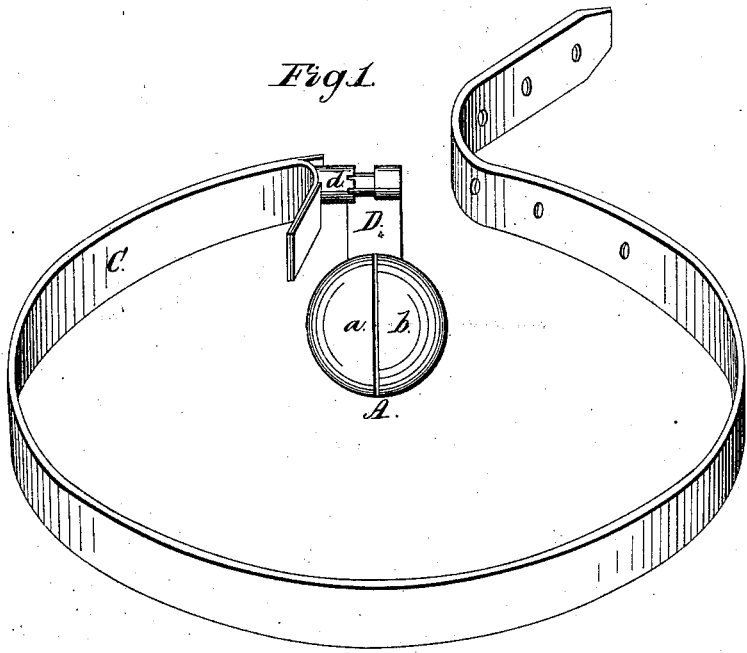
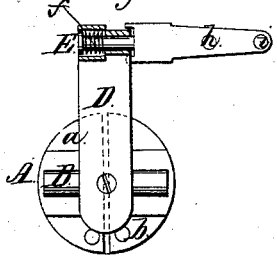
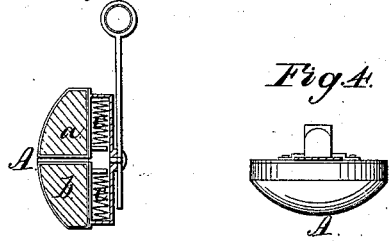
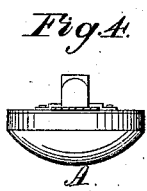
Witnesses.
Inventor.
Matthew Faloon M.D.

United States Patent Office.

MATTHEW FALOON, M. D., OF BLOOMINGTON, ILLINOIS.

Letters Patent No. 78,945, dated June 16, 1868.

IMPROVEMENT IN TRUSSES.

The Schedule referred to in these Letters Patent and making part of the same.

TO ALL WHOM IT MAY CONCERN:

Be it known that I, MATTHEW FALOON, M. D., of Bloomington, in the county of McLean, and in the State of Illinois, have invented certain new and useful Improvements in Trusses; and hereby declare that the following is a full, clear, and exact description thereof, reference being had to the accompanying drawings, and to the letters of reference marked thereon.

The nature of my invention consists in providing the truss with a divided pad, worked with either spiral or elliptic springs, for the purpose of drawing the parts of a rupture together, and in the peculiar construction of the adjusting-attachment and movable head.

To enable others skilled in the art to make and use my invention, I will proceed to describe its construction and operation.

In the annexed drawings, forming part of this specification, A represents the pad divided in two equal parts, $a$ and $b$, which are worked by means of one, two, or more spiral or elliptic springs fastened in a metallic case, B, and dividing the pads, or pressing them together in any shape or form, to be applied over a rupture or hernia for the purpose of drawing the parts together in order the more easily to heal them. As in all such openings the cavity is longer one way than the other, this can easily be accomplished by turning the lengthway of the opening of pad to suit the cavity.

The two parts $a$ and $b$ of the pad A are worked by spiral springs, $c$, one in each end of the cross-piece or metallic case B, as shown in fig. 3, which springs may be used with or without a screw to regulate them by making them stiffer or weaker.

In place of the spiral springs, elliptic springs may be used for the same purpose in any way suitable to produce the same result.

The adjusting-attachment consists of a wheel, $d$, with notches fastened to the head $e$ on the large spring C.

The movable adjusting-bar D, to which the pad A is attached, turns around the head $e$, and its edges press in the notches of wheel $d$ by means of a spring, $f$, which is under part of the head of the adjusting-bar D and around the head $e$ of the long spring C. This arrangement is for the purpose of turning the bar D around in order to set the pad in any shape that may be desired, and also to turn it around to either side to suit either right or left hernia.

The pad A can be screwed off and turned to suit either side of the adjusting-bar D.

The movable head $e$ is pivoted on the large spring C by means of a pin through hole $h$, and can be moved to either side by removing screw in hole $i$, as shown in fig. 2, and changing it to other holes on large spring.

Having thus fully described my invention, what I claim as new, and desire to secure by Letters Patent, is—

1. The divided pad A, working by means of one or more spiral or elliptic springs, substantially as and for the purposes herein set forth.

2. The combination of movable adjusting-bar D with wheel $d$ and spring $f$, arranged and operating substantially as and for the purposes herein set forth.

3. The movable head $e$, arranged and operating substantially as and for the purposes herein set forth.

In testimony that I claim the foregoing, I have hereunto set my hand, this 10th day of April, 1868.

MATTHEW FALOON, M. D.

Witnesses:
ALEX. STEELE,
W. P. MINTER.